Figure 30:
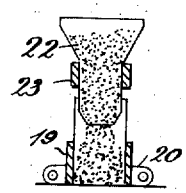
Figure 31:
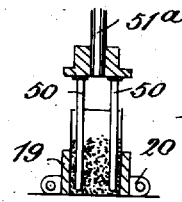

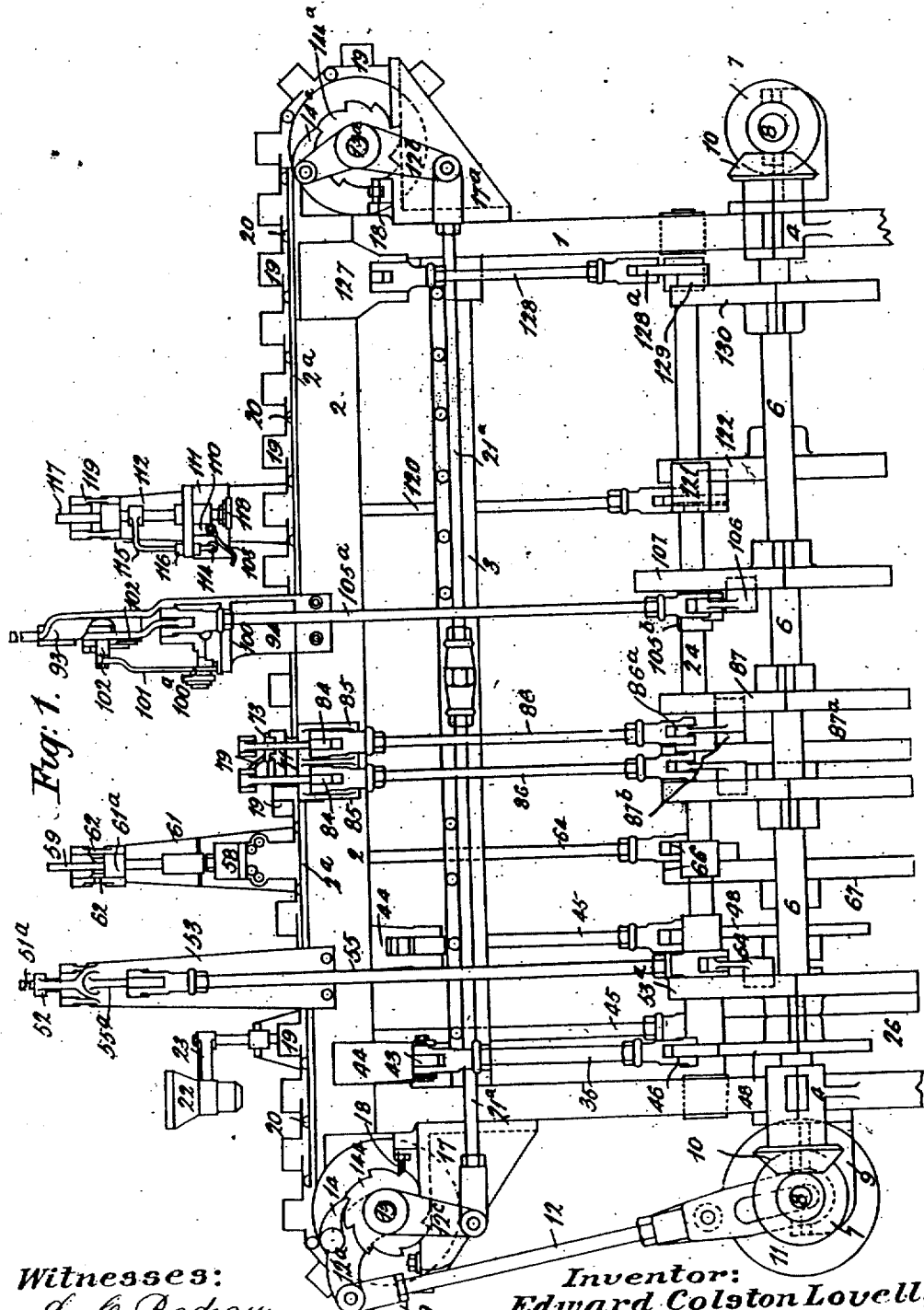

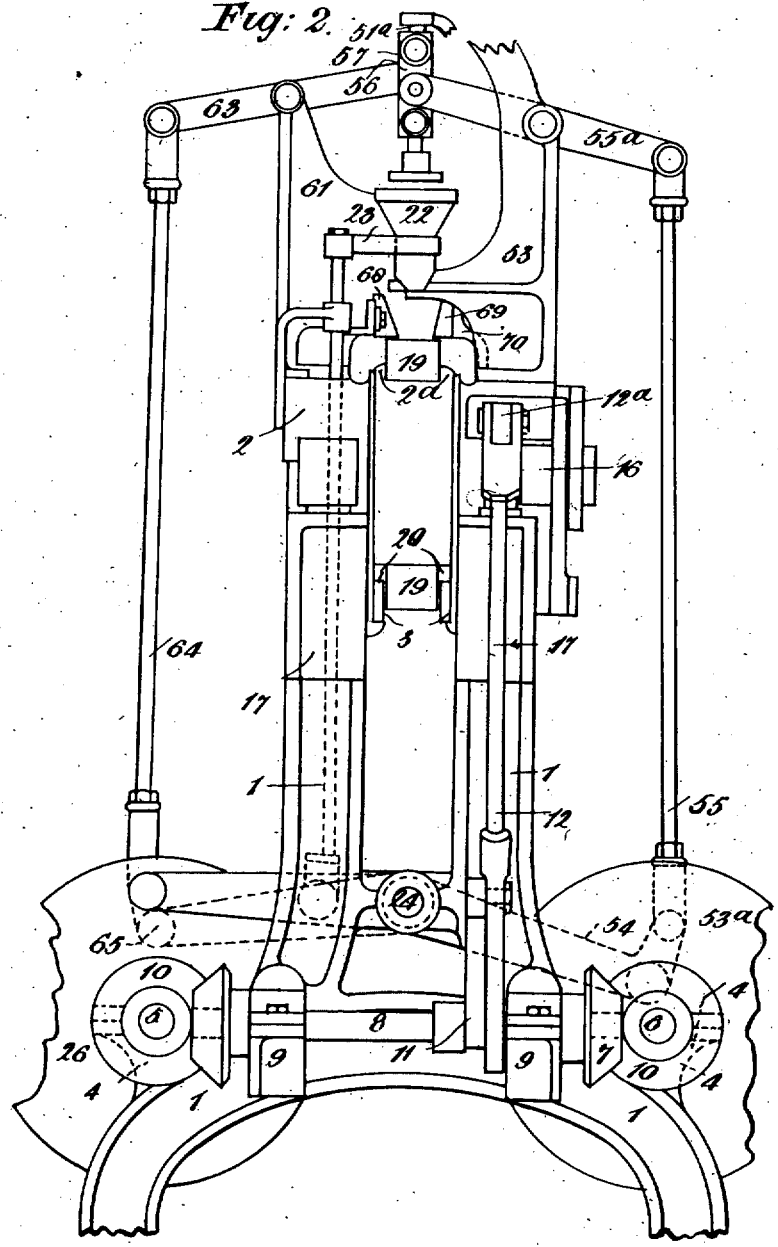

E. C. LOVELL.
MACHINE FOR PACKETING TEA OR OTHER SUBSTANCES.
APPLICATION FILED DEC. 6, 1909.
989,914.
Patented Apr. 18, 1911.
10 SHEETS—SHEET 3.
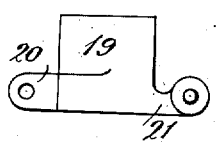
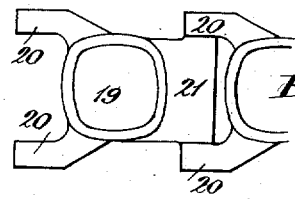
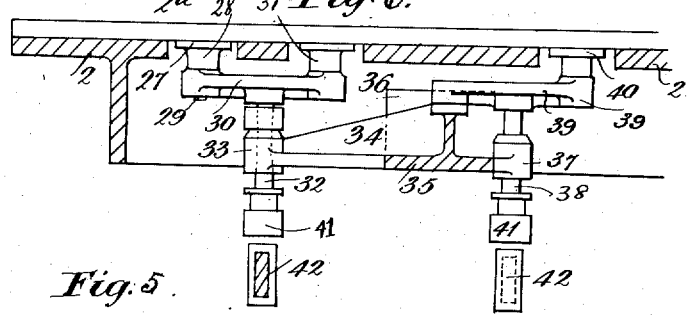
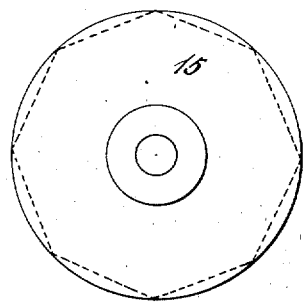
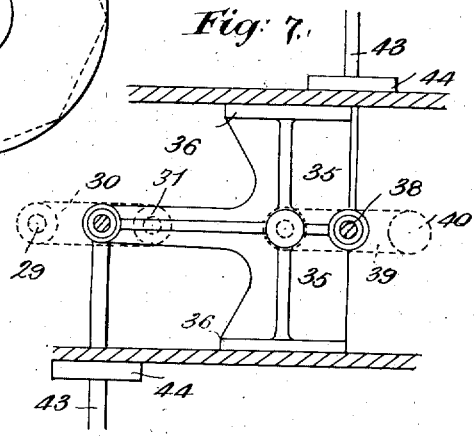
Witnesses:
L. C. Badeau.
H. D. Penney.
Inventor:
Edward Colston Lovell,
By his Attorney, F. H. Richards.

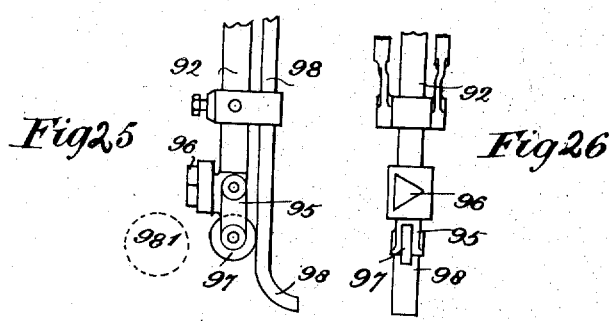
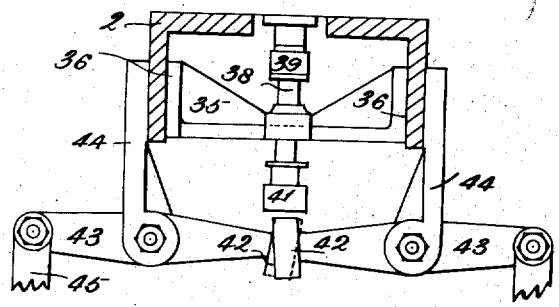
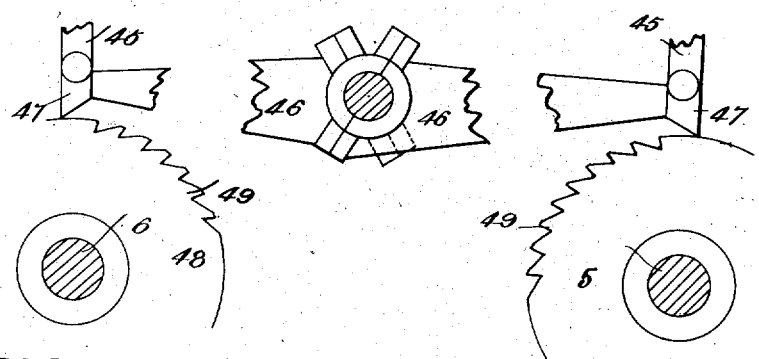

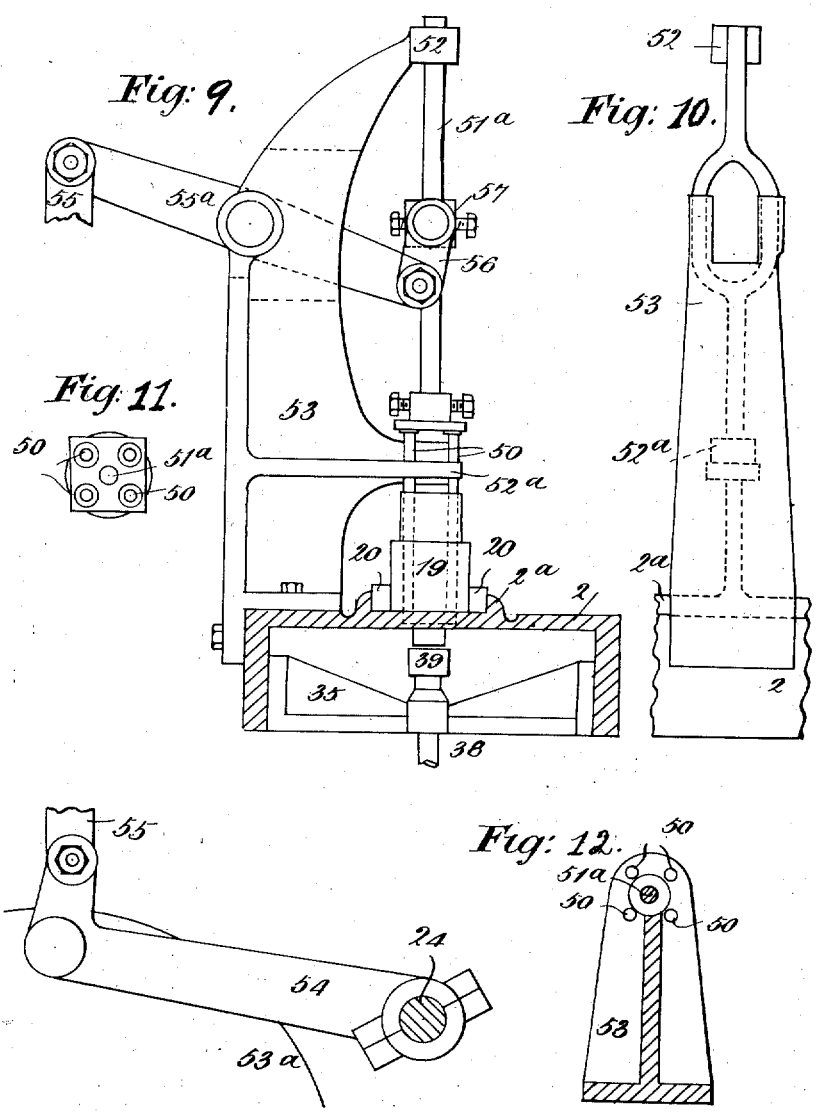

E. C. LOVELL.
MACHINE FOR PACKETING TEA OR OTHER SUBSTANCES.
APPLICATION FILED DEC. 6, 1909.
989,914.
Patented Apr. 18, 1911.
10 SHEETS—SHEET 6.
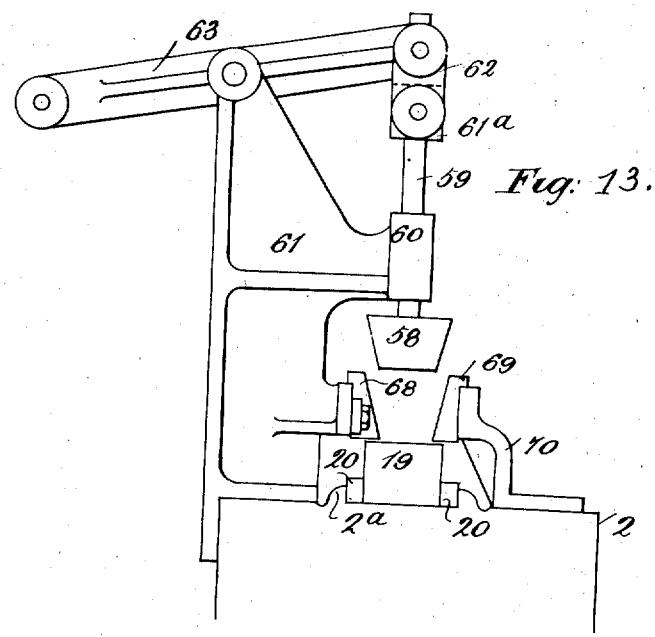
Fig. 13.
Fig. 14.
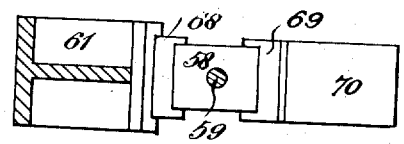
Witnesses:
L. C. Badeau.
H. D. Penney
Inventor:
Edward Colston Lovell,
By his Attorney, F. H. Richards.

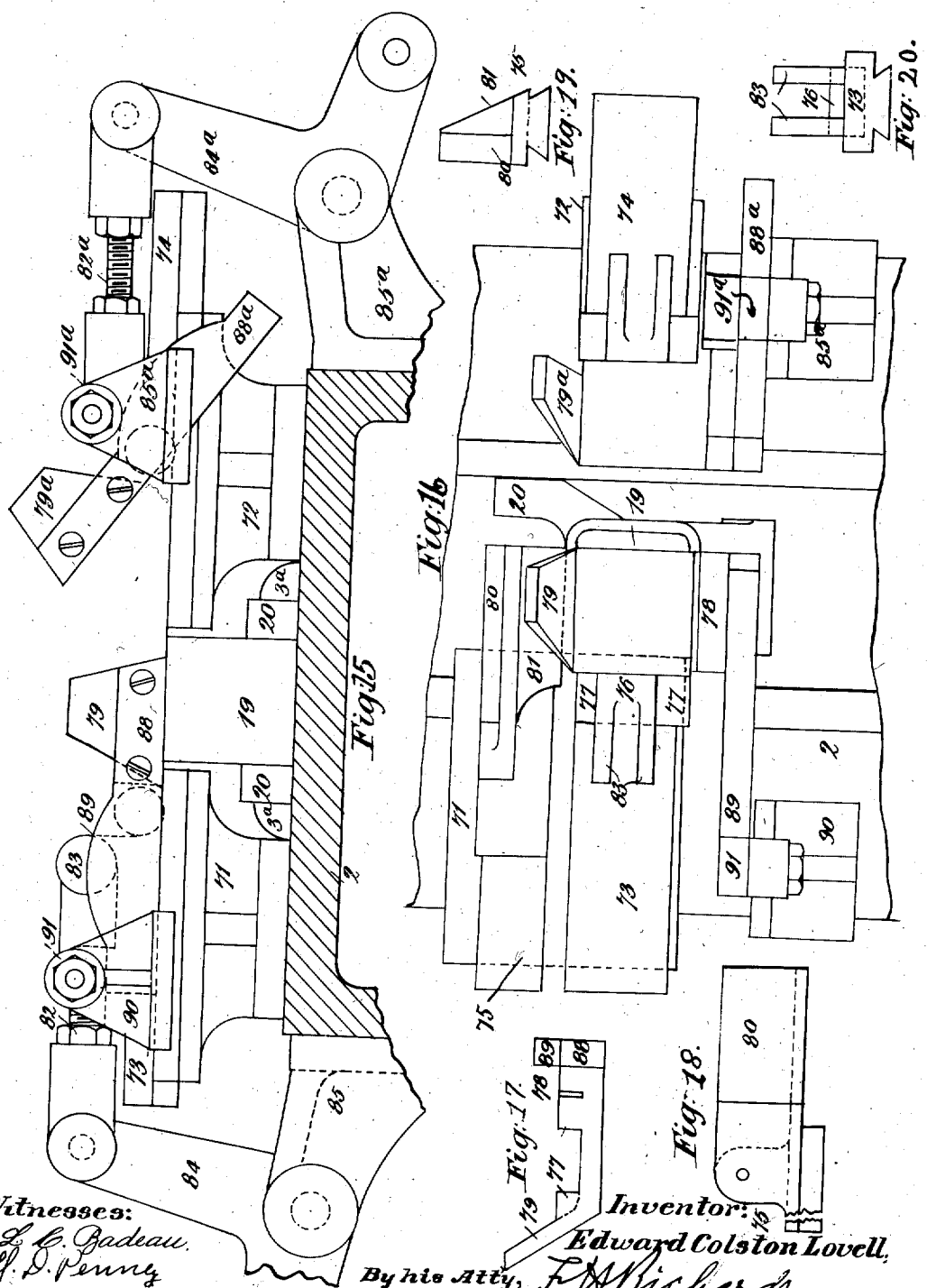

E. C. LOVELL.
MACHINE FOR PACKETING TEA OR OTHER SUBSTANCES.
APPLICATION FILED DEC. 6, 1909.
989,914.
Patented Apr. 18, 1911.
10 SHEETS—SHEET 8.
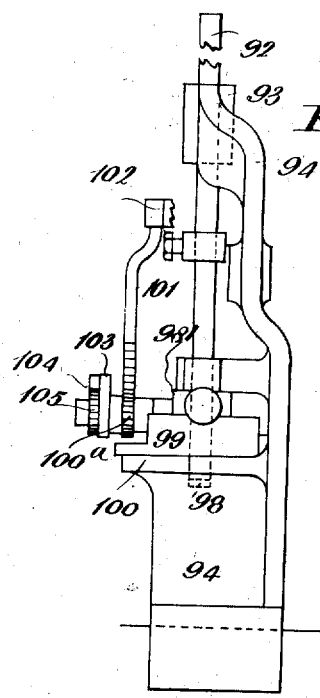
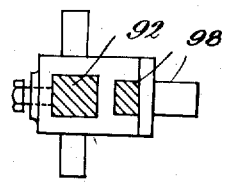
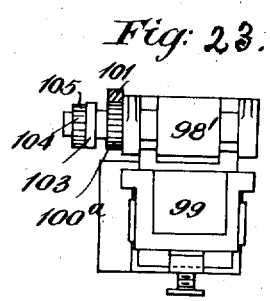
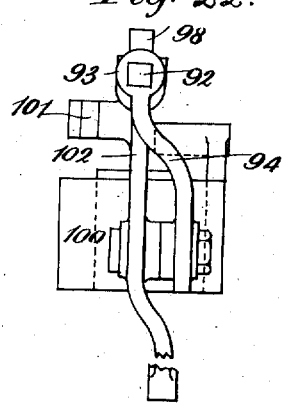
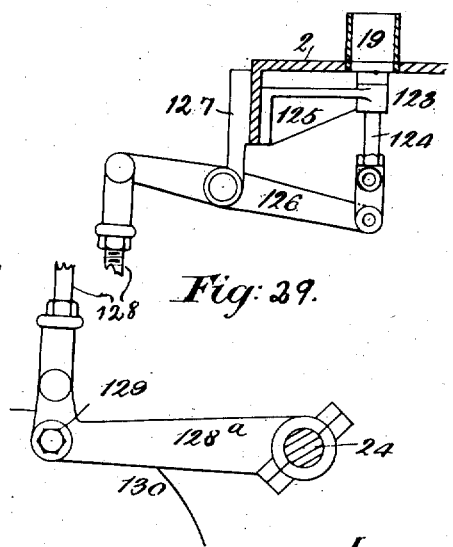
Witnesses:
L. C. Badeau.
H. D. Penney.
Inventor:
Edward Colston Lovell,
By his Attorney, F. H. Richards.

E. C. LOVELL.
MACHINE FOR PACKETING TEA OR OTHER SUBSTANCES.
APPLICATION FILED DEC. 6, 1909.

989,914.

Patented Apr. 18, 1911.
10 SHEETS—SHEET 9.

Witnesses:
L. C. Badeau.
H. D. Penney

Inventor:
Edward Colston Lovell,
By his Attorney, F. H. Richards.

E. C. LOVELL.
MACHINE FOR PACKETING TEA OR OTHER SUBSTANCES.
APPLICATION FILED DEC. 6, 1909.

989,914.

Patented Apr. 18, 1911.
10 SHEETS—SHEET 10.

Witnesses:
L. C. Badeau.
H. D. Penney.

Inventor:
Edward Colston Lovell,
By his Attorney, F. H. Richards.

UNITED STATES PATENT OFFICE.

EDWARD COLSTON LOVELL, OF MONTPELIER, ENGLAND.

MACHINE FOR PACKETING TEA OR OTHER SUBSTANCES.

989,914.

Specification of Letters Patent.  Patented Apr. 18, 1911.

Application filed December 6, 1909. Serial No. 531,543.

*To all whom it may concern:*

Be it known that I, EDWARD COLSTON LOVELL, a subject of the King of Great Britain, residing in Montpelier, Bristol, England, have invented certain new and useful Improvements in Machines for Packeting Tea or other Substances, of which the following is a specification.

This invention relates to an improved machine for packeting tea or other substances and it has for its object to construct a machine in which the packet, which may be formed in any convenient manner, and which has one end open, is filled and the end closed and secured.

The machine consists essentially of a narrow table mounted upon suitable standards and over the upper surface of which table there is intermittently moved an endless chain, the links of which comprise a series of receptacles in which the packets are retained during the operations incidental to the filling and closing of the packet. The empty packets are placed in the receptacles and during the passage of the chain over the table they are submitted successively to various devices whereby they receive the contents, which is pressed and shaken down in the packet, the sides of which are then folded over, the packet sealed and then ejected from the machine.

In order that the invention may be the better understood, drawings are appended in which:—

Figure 27:
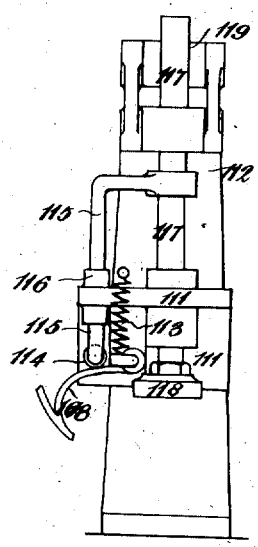
Figure 28:
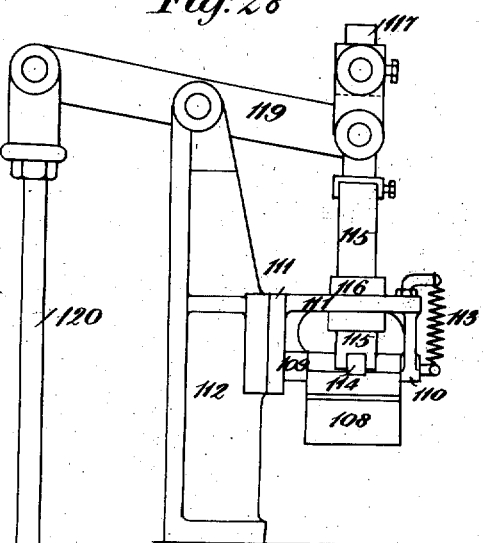
Figure 32:
Figure 33:
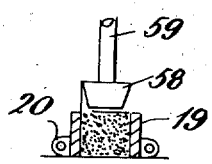

Figure 1 is a side elevation of a machine constructed in accordance with the present invention. Fig. 2 is an end elevation of the machine. Fig. 3 is a side elevation to a larger scale of one of the links of the chain. Fig. 4 is a plan showing two of said links. Fig. 5 is a side view of one of the wheels around which the chain passes and by which said chain is actuated. Fig. 6 is a side sectional view of the devices by which the packet is subjected to vibration in order to shake down the contents. Fig. 7 is a plan view of the parts just referred to; and Fig. 8 is an end view of the same. Fig. 9 is a side elevation of the brackets and the rods which enter the packet to effect the proper settling of the contents. Fig. 10 is a rear view of the bracket. Fig. 11 is a plan of the underside of the plates to which the rods are secured. Fig. 12 is a sectional plan of part of the bracket. Fig. 13 is a side elevation of a bracket and folder supported together with the side plates for supporting the upstanding sides of the upper portion of the packet. Fig. 14 is a sectional plan showing the arrangement of the supporting plates just referred to. Fig. 15 is a side elevation to a larger scale showing the arrangement of the devices for forming the second and third folds for closing the packet. Fig. 16 is a plan view of the same. Fig. 17 is a front view of the folders. Fig. 18 is an end view. Fig. 19 is a side view of a device for supporting the unfolded portion of the packet while the second and third folds are being made; and Fig. 20 is a plan of the same. Fig. 21 is a front elevation of the bracket carrying the gum reservoir and the gummer; and Fig. 22 is a plan view of the same. Fig. 23 is a plan of the gum receptacle. Fig. 24 is a plan on an enlarged scale of the head whereby the operating lever is connected to the rod carrying the gummer. Fig. 25 is a side view showing the gummer and the guide bar therefor; and Fig. 26 is a front view of the same. Fig. 27 is a front view, and Fig. 28 is a side view of the means for completing the closing of the packet. Fig. 29 is a sectional view showing the means for removing the filled and closed packet from the chain. Figs. 30 to 38 illustrate various stages in the filling and closing of the packet.

Referring to the accompanying drawings 1 1 indicate standards upon which is supported a table or surface 2 having guides 2* upon the upper surface for the chains and upon which table are mounted brackets carrying the various devices for filling and closing the packet. The standards 1 also support bars 3 which form a support for the lower run of the endless chain in which the packets are retained during the filling and closing operations. The standards 1 are provided near their lower ends upon each side with bearings 4 designed to support the ends of shafts 5, 6 upon which are mounted the various cams and other devices for operating the filling, closing, and other mechanism and which shafts receive motion from the bevel wheels 7 upon the transverse shafts 8 arranged at each end of the machine and supported in bearings 9 formed upon the standards 1. The wheels 7 are each in gear with, and operate similar wheels 10, one of which wheels is arranged at each end of the cam shafts 5 and 6, see Figs. 1 and 2. One of the transverse shafts 8 is provided with fast and loose pulleys whereby the machine may be driven by a suitable motor.

Mounted upon the driving shaft is a cam or eccentric, indicated by 11, upon which bears a roller upon the rod 12 which rod at its lower end is slotted and straddles the shaft while at its upper end it is connected to a swing arm 12ᵃ revolubly mounted upon a shaft 13. The arm 12ᵃ carries a pawl 14 which pawl engages a ratchet wheel 14ᵃ mounted upon the shaft 13 and to which shaft is secured a drum 15 having a number of flat faces as shown in Fig. 5, and over which drum passes the chain by which the packets are supported and brought into position for the filling, closing, and other operations. The shaft 13 is supported in bearings such as 16 supported by brackets 17 bolted to the supports for the table. Provision is made as at 18 whereby any elongation of the chain may be compensated for by shifting the bracket. The chain just referred to comprises a series of links pivotally connected one to the other and each of which comprises a box-like body 19 of square or other suitable cross sectional outline open at top and bottom, provided at one end with lugs 20 and at the other with an extension 21 adapted to fit between the lugs of the adjacent link. The arrangement and form of the links will be clearly seen on reference to Figs. 3 and 4. Arranged at the opposite end of the table and transversely of the line of movement of the chain is a second spindle or shaft 13ᵃ adjustably mounted on brackets 17ᵃ bolted to the supports for the table at that end. A swing arm 12ᵇ is mounted on the shaft 13ᵃ and a pawl 14ᵃ is supported by the arm and engages a ratchet wheel 14ᵃᵃ freely mounted on the shaft 13ᵃ.

12ᵇ indicates an arm secured to the end of the shaft 13ᵃ and to which is connected one end of the rod 21ᵃ, the opposite end of which is connected to an arm 12ᶜ secured to the shaft 13. By this means the chain is positively driven at each end, the chain drum 15 and that 15ᵃ at the opposite end each moving coincidently.

Where the machine is employed in conjunction with packet making machinery, the packets as they are ejected from the said packet making machine may be thrust by the ejector into one of the receptacles 19, otherwise the packets are placed by hand in the receptacle 19. The filling of the packet is effected by means of a funnel 22 into which the material is discharged, preferably by suitable weighing machinery, and which funnel prior to the discharge of the said material, in the present instance tea, is lowered in the usual manner so that its smaller end is inserted in the mouth of the packet, see Fig. 30. In order that the required movement of the funnel may be obtained, the said funnel is carried by an arm 23 secured to the upper end of a rod passing through suitable guides and at its lower end attached to one end of an arm revolubly mounted upon a shaft 24 Figs. 1 and 2. The arm at its outer end is provided with a roller 25 which engages a race formed in the side of the cam disk 26 Figs. 1 and 2. The packet during the filling operation is supported upon a plate 27 disposed within an opening formed in the table and normally disposed so that its upper surface is flush with the upper surface of the table. The plate 27 Figs. 6, 7 has formed upon its underside a boss 28 through which passes a pin 29, Fig. 7, whereby the plate 27 is attached to one side of bracket 30, to the opposite end of which is secured a plate 31. The plate 31 is similar to that 27 before referred to and an aperture is made for it in the table.

The bracket 30 is attached to the upper end of a rod 32 passing through a guide 33 formed in the arm 34 of a bracket 35, the latter bracket being secured beneath the surface of the table by means of the flanges 36 formed at each side of the body of the bracket and through which flanges, bolts pass and are tapped into the vertical members of the table. The bracket is also provided at 37 with a second guide for a rod 38 to the upper end of which is secured a second bracket 39 which is identical with bracket 30 and supports a plate 40, the same as bracket 30 aforesaid, and which plate is arranged within an aperture in the table. The rods 32 and 38 as shown in Fig. 6 are each provided at their lower ends with a circular body 41 adapted to form a head beneath which is disposed a head 42 formed at the inner end of levers 43 supported in brackets 44 secured to the side of the table. The outer ends of the levers have connected to them the upper ends of rods 45 which rods at their lower ends are attached to the outer ends of levers 46 mounted on the shaft 24 and which levers are provided at their outer ends with wedge shaped projections 47, Fig. 8 which bear upon the periphery of the two disks 48 mounted respectively upon the cam shafts 5 and 6. The disks 48 are plain for a portion of their circumference, the remaining portion being provided with a number of teeth or projections such as 49, the general arrangement being substantially that usually employed for this purpose. By this means as the disk rotates the rods 32 and 38 are periodically caused to vibrate and consequently the various plates supporting the packets are likewise vibrated and as will be seen on reference to Fig. 6, the packet is subjected both during the filling operation and for two further periods of rest to a vibratory action which has a tendency to cause the tea to shake down within the packet. After the filling has been effected the packet is moved onward and at the next period of rest is vibrated as aforesaid after which it comes to rest beneath a device comprising a number of vertically disposed rods 50 which are caused to descend and press upon the material, see Fig. 31. The rods just referred to are secured to a plate 51. The plate 51 is attached to the rod 51ª, said rod being supported in guides 52, 52ª formed upon the bracket 53 Figs. 1, 2 and 9 to 11 and which bracket is bolted or otherwise secured to the table of the machine. The rods 51, of which there are four, also pass through holes formed in the lower guide 52ª for rod 51 as shown in Fig. 11. The rod 51ª receives motion from a disk indicated by 53ª in Figs. 1, 2 and 9 in which is formed a suitable race which is engaged by a roller upon the end of the arm 54 freely mounted at its opposite end on shaft 24. The arm has attached to its outer end the lower end of a rod 55 which rod at its upper end is mounted on the lever 55ª on bracket 53. The lever is connected by means of links 56 with a head 57 secured to rod 51ª. The packet after the withdrawal of the rods 51, 51ª, again advances and it receives its final shaking preparatory to the closing of the ends, the first operation of which begins when the packet next comes to rest, see Fig. 32. The closing just referred to is effected by means of a head 58 Figs. 1, 13 and 14, and which head is attached to the lower end of a rod 59 working in a guide 60 formed upon a bracket 61 Figs. 1, 2, 13 and 14. The rod 59 at its upper end is connected through a head 61ª and links 62 with a lever 63 mounted on bracket 61 and which lever at its outer end is connected to the upper end of a rod 64 Figs. 1 and 2, which rod at its lower end is connected to an arm 65 mounted on shaft 24. The arm 65 at its outer end is provided with a roller 66 engaging a suitable race formed in the side of the disk 67 Fig. 1. As the packet is brought forward beneath the head 58, the upstanding side facing the head, comes into contact with said head which continues to move downward as the packet is advanced until just before the packet comes to rest the downward movement of the head ceases and no further movement takes place until the packet has come to rest when the head descends somewhat, giving a final pressure to the turned over portion of the packet prior to being withdrawn, see Fig. 33. In order that the sides of the packet shall not be injured during the folding, in the manner just described, I provide supporting plates such as 68, 69 arranged above the chain and one on each side thereof as shown in Figs. 13 and 14. The plates are supported respectively by the bracket 61 and a bracket 70 arranged upon the table opposite the bracket 61. The folding of the sides of the packet are next effected and this is accomplished by means of horizontally reciprocating bodies which are provided with cam surfaces arranged to operate by fixed rollers in the known manner. The folders are arranged one on each side of the chain. The remaining portion, the folding of which has yet to be effected to complete the closing of the packet, is, during the operation just referred to, supported by a backing plate so that its distortion or injury is avoided. The folders as aforesaid are disposed one on each side of the table; their construction and arrangement will be readily understood on reference to Figs. 1, 15 to 20.

Referring to Figs. 15 and 16, 71 and 72 indicate brackets disposed on opposite sides of the chain and having guides thereon for slippers 73, 74. The bracket 71 is also provided with a second set of guideways for a slipper 75. The slipper 73 has formed upon its front end a boss 76 perforated for the passage of a pin whereby the folder proper is pivotally connected thereto. The folder is provided at each end with bosses 77 and a projection 78, Fig. 17 to which, as will be presently described, is secured a cam surface whereby the folder is tilted into an inclined vertical position. The folder upon the opposite side is provided with an inclined plate 79 which as the folder is advanced prevents the upstanding portion of the packet from being damaged, and with this object in view the slipper 75 is provided with a plate 80 having an inclined face 81, see Figs. 19 and 18 and which plate prior to the advance of the folder is moved into a position such that it is behind the aforesaid upstanding portion. The movement of the slipper 73 is effected by means of a rod 82 connected at one end of the slipper at the point 83 and at the other attached to the upper end of a bell crank lever 84 pivotally mounted in a double bracket 85 secured to the side of the table. The lever has connected to it at its opposite end the upper end of a rod 86 connected at its lower end to an arm freely mounted on shaft 24 and which arm at its outer end is provided with a roller adapted to engage a race formed in the side of a disk 87 mounted upon the cam shaft. A similar arrangement is provided for the slipper 75 as shown in Figs. 1 and 16, and the parts being of the same form and construction, they are indicated by the same reference numerals. The cam surface before referred to as being secured to the folders, comprises a bar 88, secured by screws to the side of the folder, as shown in Figs. 15 and 17, and having upon its upper surface a curved portion 89, 90, indicates a bracket supported in any suitable manner upon the table, the support however being omitted for the sake of clearness, and carrying a roller 91 which bears upon the upper surface of the bar 88. Consequently as the bar is moved backward, the roller bearing upon the curved portion of the bar causes the folder to be tilted upward as shown to the right of Fig. 15 and to remain in this inclined position until the folder is advanced when it is gradually lowered. By this means as the folder comes into contact with the side of the packet it has a forward wiping action under which the folding of the side of the packet is accomplished in a very effective manner and without risk of tearing or otherwise damaging the paper or other material of which the packet is formed. The folder upon the opposite side of the chain, which folder as aforesaid is mounted upon the slipper 74 sliding in bracket 72, is supported in the same manner as the folder just described, and is provided on one side with an inclined plate 79$^a$ and has upon its opposite side a bar 88$^a$ acted upon by a roller 91$^a$ carried by a bracket 90$^a$. The movement of the slipper 74 is effected by means of a bell crank lever 84$^a$ mounted in a bracket 85$^a$ secured to the table and receiving motion through a cam race formed in the side of a disk 87$^a$ upon the cam shaft 5. The disk 87$^a$ actuates an arm 87$^b$ on the shaft 24; the motion being transmitted from said arm by a rod connected at its upper and lower ends respectively to the lever 84$^a$ and arm 87$^b$. The motion of the lever 84$^a$ is transmitted to the slipper 73 by means of a rod 82$^a$.

Figure 34:
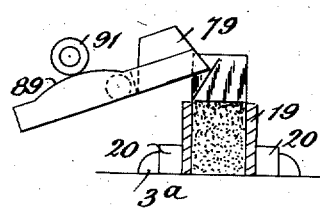
Figure 35:
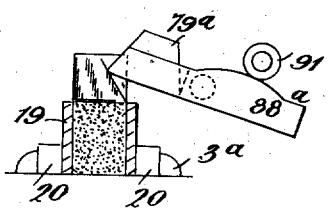
Figure 36:
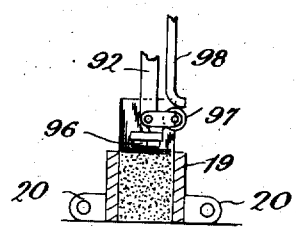
Figure 37:
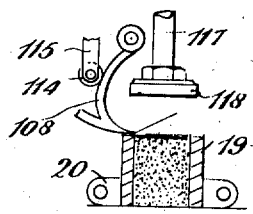
Figure 38:
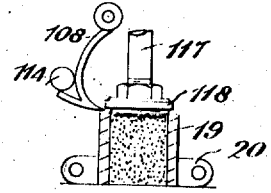

In operation the backing plate is first brought into a position to support that portion of the packet that is not to be operated upon, after which the folder on the same side of the chain as the slipper carrying the backing plate, comes into operation, see Fig. 34, being followed in its backward movement by the opposite folder see Fig. 35. The backing plate remains in position until the two folders are both withdrawn. Springs may be provided to assist the folders. The packet is now closed except for one remaining portion prior to the folding of which it is necessary that the surface upon which it is to be folded should have applied thereto an adhesive in order to secure the final fold. The gumming is effected at the second period of rest after the folding just referred to, and the gum is applied by means of a vertically reciprocating rod 92 passing through a guide 93 formed on the bracket 94 secured to the table of the machine see Figs. 1, 21 and 22. The rod is of rectangular cross section and has also pivotally connected to it at its lower end an extension 95, in Figs. 25 and 26, to the face of which is secured in any suitable manner a gumming block or surface 96 which is preferably of triangular outline as shown in Fig. 26. The extension 95 has at its free end a roller 97 which, under the action of a spring, not shown, is caused to bear against the guide bar 98, the upper end of which is secured to the guide for the rod 92. The lower end of the bar 98 is curved as shown so that when the rod 92 reaches the limit of its downward movement the extension 95, under the influence of the spring aforesaid, assumes a horizontal position simultaneously with which operation it comes into contact with the top of the packet and applies the adhesive thereto, see Fig. 36. The gummer in its vertical movement passes over a gum roller 98' mounted in a gum reservoir 99 carried by the horizontal member 100 of the bracket 94. The gum roller is rotated by means of a pinion 100$^a$ freely mounted on the gum roller spindle, and which pinion engages a rack 101, secured to a boss formed upon the lever 102 by which the rod 92 is reciprocated. The arrangement of the rack may be seen on reference to Figs. 1 and 21, certain parts in the latter figure being omitted so that the said rack may be more clearly shown. A roller is provided to keep the rack in gear with the pinion, and the pinion has connected to it a disk 103, carrying a pawl 104, which latter engages a ratchet wheel 105, fast to the spindle of the gum roller.

The movement of the operating lever 102 is effected by means of the rod 105$^a$ connected at one end to the lever aforesaid and at the other attached to an arm 105$^b$ freely mounted on shaft 24 and which arm carries a roller, 106, engaging a cam race in disk 107 see Fig. 1. The packet after the application of the gum just described is again moved forward and at the second position of rest it is located beneath the folding device by which the final folding and sealing is effected. The device comprises a hinged plate 108 Figs. 1, 27 and 28, which plate is pivotally mounted in bearings 109, 110, formed upon the underside of the horizontal portion of the angle plate 111 which is secured to the bracket 112. The plate 108 is under the influence of a spring 113 by which it is held against a roller 114 carried by the lower end of a rod 115 which rod passes through a guide 116 on the plate 111 and at its upper end is attached to the vertically reciprocating rod 117. The rod 117 is supported in a guide formed in the plate 111 and it has attached at its lower end a presser plate 118 designed, when the final fold has been made, see Fig. 37, to press same down and secure its proper adhesion so as to complete the closing of the packet, see Fig. 38. It will be noted that the folder presents a curved surface to the roller 114 and the outline of this surface is such that as the roller reaches its limit of downward movement the folder is permitted to move outward so as to be clear of the presser plate 118. The movement of the rod 117 is effected by means of a lever 119 mounted in bracket 112 and at one end connected by means of links with the rod 117 and at the other connected to the upper end of a rod 120 at its lower end secured to a lever 121 freely mounted on the shaft 24 and carrying a roller in gear with a cam race in the disk 122. After the gumming and final closing in the manner just described, the packet is ultimately removed from the chain and this is effected by means of the plate 123 Fig. 29, arranged in an opening in the table and which plate is attached to the upper end of the rod 124, guide for said rod being provided in the bracket 125 secured beneath said table. The lower end of the rod 124 is connected by means of links with a lever 126 supported in a bracket 127 and operated by a rod 128 connected at its lower end to an arm 128ª freely mounted on shaft 24 and carrying a roller 129 engaging a cam race in the disk 130 on shaft 6.

Having now particularly described and ascertained the nature of my said invention, and in what manner the same is to be performed, I declare that what I claim is:—

1. A machine for packing tea or other substances, comprising an endless intermittently actuated chain, a support therefor, receptacles upon the chain for retaining the packets, a vertically reciprocating discharge chute entering the mouth of the packet, means for vibrating the packet during and after the filling, vertically reciprocating rods entering the material in the packet, means acting upon the leading upstanding portion of the mouth of the packet to fold same over and press same, supports for the side portions of the mouth of the packet, folders arranged to reciprocate transversely of the line of movement of the chain and acting alternately upon the sides of the mouth of the packet, a support for the remaining upstanding portion of the mouth of the packet, a vertically reciprocating gummer adapted to apply gum to the outer surface of the uppermost fold, a radially moving plate acting upon the upstanding fold to turn same down and a vertically reciprocating presser plate for pressing the final fold down on to the adhesive and means for ejecting the packet.

2. A machine for packing tea or other substances, comprising an endless intermittently actuated chain, receptacles upon the chain for retaining the packets, a vertically reciprocating chute entering the mouth of the packet, means for vibrating the packet during and after the filling, vertically reciprocating rods entering the material in the packet, means acting upon the leading upstanding portion of the packet comprising a block of metal attached to a vertically reciprocating rod, said block being disposed in the path of the packet, supports for the side portions of the mouth of the packet, folders arranged to reciprocate transversely of the line of movement of the chain and acting alternately upon the sides of the mouth of the packet, a support for the remaining upstanding portion of the mouth of the packet, a vertically reciprocating gummer adapted to apply gum to the outer surface of the uppermost fold, a radially moving plate acting upon the upstanding fold to turn same down and a vertically reciprocating presser plate for pressing the final fold down on to the adhesive and means for ejecting the packet.

3. A machine for packing tea or other substances comprising an endless intermittently actuated chain, receptacles upon the chain for retaining the packets, a vertically reciprocating chute entering the mouth of the packet, means for vibrating the packet both during and after the filling, vertically reciprocating rods entering the material in the packet, means acting upon the leading upstanding portion of the packet comprising a block of metal of rectangular tapering outline attached to a vertically reciprocating rod disposed in the path of the packet, inclined side plates for supporting the side portions of the packet during the operation of the block, folders arranged to traverse the line of movement of the chain and acting alternately upon the sides of the mouth of the packet, a support for the remaining upstanding portion of the packet, a vertically reciprocating gummer adapted to apply gum to the outer surface of the uppermost fold, a radially moving plate acting upon the upstanding fold to turn same down and a vertically reciprocating presser plate for pressing the final fold down on to the adhesive and means for ejecting the packet.

4. A machine for packing tea or other substances comprising an endless intermittently actuated chain, receptacles upon the chain for retaining the packets, a vertically reciprocating chute entering the mouth of the packet, means for vibrating the packet, both during and after the filling, vertically reciprocating rods entering the material in the packet, means acting upon the leading upstanding portion of the packet comprising a block of metal of rectangular tapering outline attached to a vertically reciprocating rod disposed in the path of the packet, inclined side plates for supporting the side portions of the packet during the operation of the block, folders pivotally mounted upon slides disposed upon opposite sides of the chain and moving transversely thereto, cam surfaces upon the folders, rollers engaging said cam surfaces, a support for the remaining upstanding portion of the mouth of the packet, a vertically reciprocating gummer adapted to apply gum to the outer surface of the uppermost fold, a radially moving plate acting upon the upstanding fold to turn same down, and a vertically reciprocating presser plate for pressing the final fold down on to the adhesive and means for ejecting the packet.

5. A machine for packing tea or other substances comprising an endless intermittently actuated chain, receptacles upon the chain for retaining the packets, a vertically reciprocating discharge chute entering the mouth of the packet, means for vibrating the packet both during and after the filling, vertically reciprocating rods entering the material in the packet, means acting upon the leading upstanding portion of the packet comprising a block of metal of rectangular tapering outline attached to a vertically reciprocating rod disposed in the path of the packet, inclined side plates for supporting the side portions of the packet during the operation of the block, folders pivotally mounted upon slides disposed upon opposite sides of the chain and moving transversely thereto, cam surfaces upon the folders, rollers engaging said cam surfaces, a slide also arranged to move transversely of the chain, said slide carrying an inclined plate designed to support the remaining upstanding portion of the mouth of the packet, a vertically reciprocating gummer adapted to apply gum to the outer surface of the uppermost fold, a radially moving plate acting upon the upstanding fold to turn same down and a vertically reciprocating presser plate for pressing the final fold down on to the adhesive, and means for ejecting the packet.

6. A machine for packing tea or other substances comprising an endless intermittently actuated chain, receptacles upon the chain for retaining the packets, a vertically reciprocating chute entering the mouth of the packet, means for vibrating the packet both during and after the filling, vertically reciprocating rods entering the material in the packet, means acting upon the leading upstanding portion of the packet comprising a block of metal of rectangular tapering outline attached to a vertically reciprocating rod disposed in the path of the packet, inclined side plates for supporting the side portions of the packet during the operation of the block, folders pivotally mounted upon slides disposed upon opposite sides of the chain and moving transversely thereto, cam surfaces upon the folders, rollers engaging said cam surfaces, a slide also arranged to move transversely of the chain, said slide carrying an inclined plate designed to support the remaining upstanding portion of the mouth of the packet, a vertically reciprocating rod carrying a hinged member, a roller upon such hinged member, a guide for the roller, a spring acting upon the hinged member to bring same into a horizontal position, a gum carrying surface upon the hinged portions and a gum roll rotating in a reservoir and with which the gum carrying surface comes into contact, a radially moving plate acting upon the upstanding fold to turn same down, and a vertically reciprocating presser plate for pressing the final fold down on to the adhesive and means for ejecting the packet.

7. A machine for packing tea or other substances comprising an endless intermittently actuated chain, receptacles upon the chain for retaining the packets, a vertically reciprocating chute entering the mouth of the packet, means for vibrating the packet both during and after the filling, vertically reciprocating rods entering the material in the packet, means acting upon the leading upstanding portion of the packet comprising a block of metal of rectangular tapering outline attached to a vertically reciprocating rod disposed in the path of the packet, inclined side plates for supporting the side portions of the packet during the operation of the block, folders pivotally mounted upon slides disposed upon opposite sides of the chain and moving transversely thereto, cam surfaces upon the folders, rollers engaging said cam surfaces, a slide also arranged to move transversely of the chain, said slide carrying an inclined plate designed to support the remaining upstanding portion of the mouth of the packet, a vertically reciprocating rod carrying a hinged member, a roller upon such hinged member, a guide for the roller, a spring acting upon the hinged member to bring same into a horizontal position, a gum carrying surface upon the hinged portion, and a gum roll rotating in a reservoir and with which the gum carrying surface comes into contact, folding means for effecting the final fold of the mouth of the packet comprising a curved plate, a roller carried by a member connected to a vertically reciprocating rod and acting on said plate, a spring acting upon said plate to oppose the action of the roller, a presser plate upon the vertically reciprocating rod, and means for ejecting the packet.

In witness whereof I have hereunto affixed my signature in the presence of the two undersigned witnesses.

EDWARD COLSTON LOVELL.

Witnesses:
CARL R. LOOP,
FREDK. L. RAND.